A. W. McCUAIG & I. N. CHIDA.
DRAFTSMAN'S APPLIANCE.
APPLICATION FILED MAY 24, 1916.
1,213,664. Patented Jan. 23, 1917.
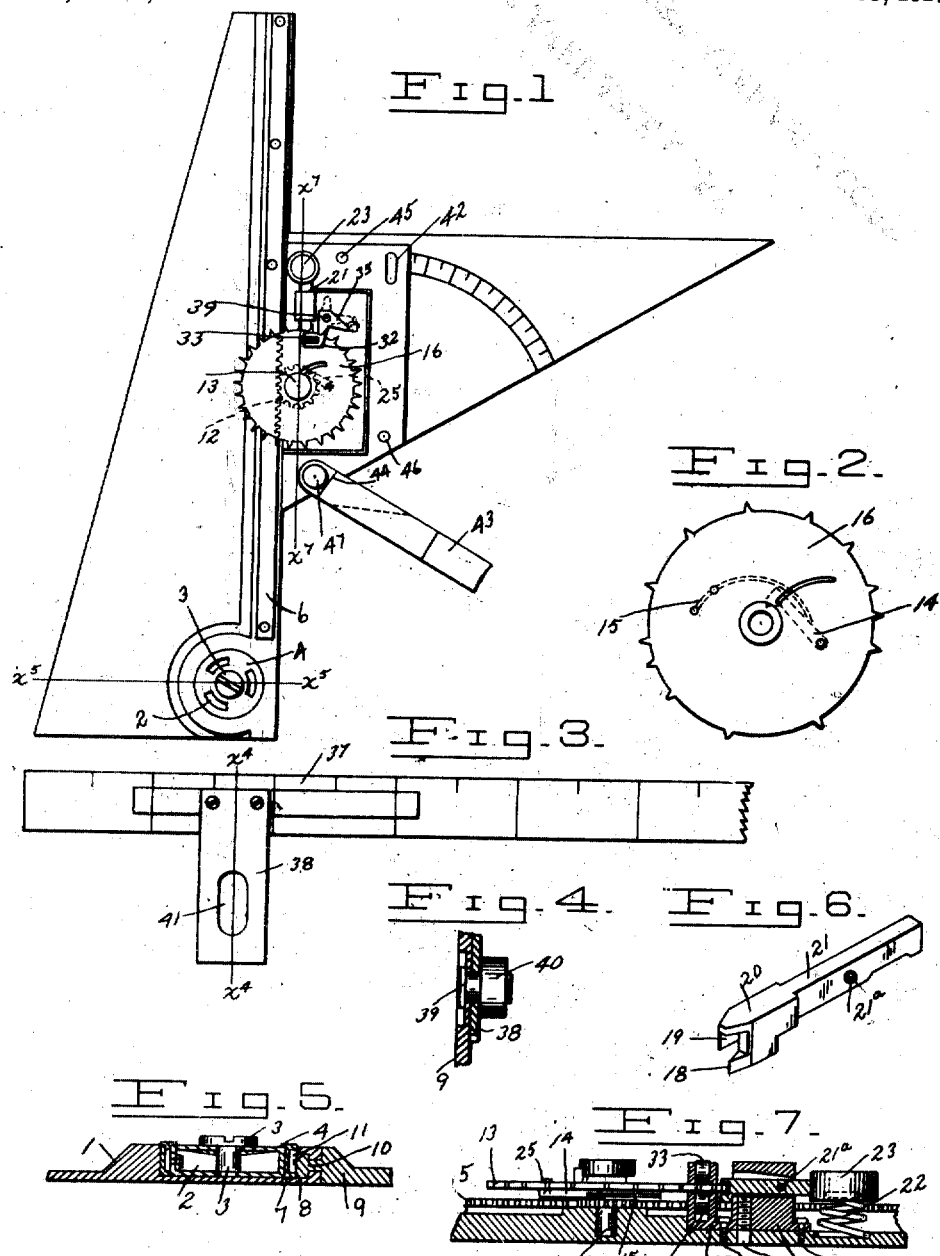

UNITED STATES PATENT OFFICE.

ANTHONY W. McCUAIG AND TONY N. CHIDA, OF LOS ANGELES, CALIFORNIA.

DRAFTSMAN'S APPLIANCE.

1,213,664.  Specification of Letters Patent.  Patented Jan. 23, 1917.

Application filed May 24, 1916. Serial No. 99,615.

*To all whom it may concern:*

Be it known that we, ANTHONY W. McCUAIG, a citizen of the United States of America, and TONY N. CHIDA, a subject of the Emperor of Japan, both residing at Los Angeles, in the county of Los Angeles and State of California, have invented certain new and useful Improvements in Draftsmen's Appliances, and do hereby declare that the following is a full, clear, and exact description of the same, reference being had to the accompanying drawings, which together with the figures of reference marked thereon form a part of this specification.

The said description and drawings illustrate the invention to such an extent as to enable any person skilled in the art or science to which the invention appertains to make, construct and use the same.

This invention relates to certain new and useful improvements in instruments, devices or appliances for use by draftsmen, engineers and architects, being a combination of several appliances, as hereinafter set forth.

The invention has for its objects, among others, to provide an improved instrument, device or appliance of the nature stated, which shall be reliable and accurate in its operation and movements, simple as regards construction and means for governing movements, particular reference being made to the ease with which movements of desired distances may be obtained, and at the same time providing a durable and convenient appliance, which will be positive in operation and likewise relatively inexpensive in construction and generally superior in efficiency.

The ruling or straight-edge member is readily detachable from the base member and the extension and protractor arms from the ruling member or straight-edge, thereby furnishing in reality two triangles, a protractor and several scales, all of which are devices or appliances necessary in preparing and completing maps, plans and drawings.

We provide means for regulating the distance between parallel lines or rulings, both equi-distant from each other and increasing or decreasing the spacing between parallel lines within or over a given distance or area. We provide means for regulating the strength and rapidity of movements of the ruling or straight-edge member. We also provide for the free running of the pinion wheel of the instrument, device or appliance, and consequently for the free movement of the ruling or straight-edge member when it is moved in a reverse or upward direction. Further, we provide means for the free movement of the ruling or straight-edge member in either of its two movable directions when such movement is desired.

The lever-operating escapement is of novel construction and arrangement. By its operation the movements of distances of the ruling or straight-edge member of the instrument are actuated. The power spring or driving drum, together with the means provided for regulating and controlling its power or tension upon the ruling or straight-edge member, is also of novel construction, actuating the speed and strength of movements of the said ruling or straight-edge member when said tension is brought to bear upon said member by means of the operation of the escapement.

Other objects and advantages of the invention will hereafter appear, and the novel features thereof will be specifically defined by the appended claims.

Referring now to the several views or figures: Figure 1 is a top plan view of the complete instrument, device or appliance, with the protractor arm broken off and not showing the ruling or straight-edge extension. Fig. 2 is a top plan view of ratchet wheel, the distance of movements of the ruling or straight-edge member of the instrument being governed by the number and position of the teeth on the ratchet wheel in use. There will be a variety of said wheels, but only one is shown. Fig. 3 is a top plan view of the ruling or straight-edge extension, broken off. Fig. 4 is partially a sectional view of the ruling or straight-edge-extension on the line 3—3, said extension appearing as when attached to the ruling or straight-edge member of the instrument. Fig. 5 is partially a sectional view of power spring or driving drum and means of connecting the base member of the instrument with the ruling or straight-edge member on the line 1—1. Fig. 6 is a perspective view of the escapement dogs, dog-holder and lever. Fig. 7 is partially a sectional view of the escapement mechanism of the instrument on the line 2—2, also showing rack and rack cover.

Like letters of reference indicate like parts throughout the several views.

Referring more particularly to the drawings, the numeral 1 designates the base member of the instrument, a triangle in the accompanying drawing, but which may be of any suitable shape, substantially as shown, upon which is mounted or within which may be contained the power spring or driving drum 2, the purpose of said spring or driving drum, when connected, being to create a tension between the base member 1 and the ruling or straight-edge member 9, hereinafter described. Said spring or driving drum 2 is retained by the pin or bearing 3, upon which is also mounted or around which revolves the small ratchet wheel 4 which regulates the tension created by the spring or driving drum 2 and its connections.

Upon the face of the base member 1 is a longitudinal bar or rack 5. Said bar or rack being fastened to the base member 1 in any suitable manner and extends substantially the entire length thereof, parallel with the edge and the required distance therefrom, as illustrated. Along the right-hand edge of this bar or rack is a plurality of transverse grooves or teeth for engagement with the toothed pinion 12, which pinion is hereinafter described. Said bar or rack is covered by a thin bar 6 which is fastened thereto in any suitable manner.

In the altitudinal edge of the base member 1 is a groove 8, so shaped as to receive and permit of a sliding movement only a counterpart 10 of the straight-edge member 9, hereinafter described. 7 is a groove or slot within the altitudinal edge of said base member 1 and also within the opening created by reason of the groove 8. Said groove or slot 7 is to receive and permit the passage of a necessary portion of the tape extension of the power spring or driving drum 2.

The numeral 9 designates the ruling or straight-edge member of the instrument, device or appliance, a triangle in the accompanying drawings, but which may be of any suitable shape, substantially as shown. Said ruling or straight edge member is connected to the base member 1 as hereinbefore set forth, and when so connected is capable of a sliding movement only. To a screw, pin or hook 11 is fastened one end of a tape, the other end of which tape is fastened to the power spring or driving drum, and by this fastening or connection a tension between the base member 1 and the ruling or straight-edge member 9 is established.

Upon the ruling or straight-edge member 9 of the instrument is mounted, or may be contained therein, the escapement mechanism of the instrument, composed of a toothed pinion 12, which engages with the rack 5, which rack was hereinbefore described. Normally said pinion is capable of running freely in a reverse direction only, or when the ruling member of the instrument is returned or moved upward or outward. Normally it is prevented from running freely in the other direction by reason of the small lock ratchet 13, dog 14 and spring 15. By means of the small pin or knob 25 the dog 14 may be disengaged from the teeth of the ratchet 13, thus permitting said pinion 12 and ratchet 13 to run freely in either direction, and consequently allowing the ruling or straight-edge member of the instrument to be moved freely in either direction. Also, a ratchet or escapement ratchet wheel 16, which like ratchet 13 and the pinion 12, rotates around the pin or bearing 17. To the ratchet wheel 16 are fastened in a suitable manner and position the small dog 14 and the spring 15, hereinbefore described. Engaging with the ratchet wheel 16 are two dogs or pawls 18 and 19, which are mounted upon a dog holder or rocker 20, an extension or arm of which forms the lever 21 having its fulcrum at $21^a$, which lever has a return spring 22, upon the outer end of which lever 21 is mounted the key of the instrument 23. The lever 21 is held in position by the pin or bearing 24, which acts as a fulcrum therefor. When the key 23 is depressed, the dog or pawl 19 is withdrawn from the ratchet wheel 16 and moves, normally, upward and the dog or pawl 18 is engaged with said ratchet wheel 16. When the key is released, the dog or pawl 18 is released and the dog or pawl 19 caused to engage with the next tooth of the ratchet wheel, thus permitting the power spring or driving drum 2 to move the ratchet wheel 16 clockwise one space or one notch of the said wheel as a result of each complete operation of the key 23.

When the ruling or straight-edge member of the device is returned or moved upward it winds the power spring or driving drum 2, giving the necessary tension for the movement of the said ruling or straight-edge member as a result of the operation of the escapement upon the depression and release of the key 23, as hereinbefore set forth.

The numeral 26 designates a supporting block which is fastened securely and in the required position to the ruling member 9 of the instrument by means of a suitable number of screws similar to 27 and 28, and having a slot or opening 29 to receive the lever 21, hereinbefore described. Between two fingers or projections of the extension or arm 30 is hung a small roller 31, and between the fingers or two projections of the movable extension or arm 32 of the block 26 is hung the small roller 33. Said rollers 31 and 33 assist in holding the teeth of the ratchet wheel 16 in position for proper engagement with the dogs or pawls 18 and 19, and said movable extension or arm 32 is supported by or swings on the screw or bearing 34, and may be moved out of normal position by means of the small lever 35 when it is desired to change ratchet wheels. The position or distance of the stroke or movement of the lever 21 may be regulated by the screw 36.

The numeral 37 designates the ruling or straight-edge extension of the instrument, having a connecting bar or member 38 securely fastened thereto in any suitable manner, and may be connected or affixed to the instrument by means of the bolt 39, nut 40 and the openings or holes 41 and 42.

The protractor arm 43 may be fastened in a suitable manner to the ruling or straight-edge member of the instrument at any of the points, holes or openings 45, 46 or 47 by means of the thumbscrew 44, or holes or openings may be made at other points and said protractor arm fastened in the desired position.

Having thus fully described our invention, what we claim and desire to secure by Letters Patent, is:

1. In combination with two members connected for relative movement, a spring drum on one of said members, means connecting said drum and the other member to cause relative movement between the members, escapement mechanism on one member and coöperating with the other member, and means for manually operating said escapement mechanism.

2. In combination with two members connected for relative movement, a spring drum on one of said members, means connecting said drum and the other member to cause relative movement between the members, escapement mechanism on one member and coöperating with the other member, and means for manually operating said escapement mechanism; the member with which said escapement mechanism coöperates being provided with a rack to that end.

3. In combination with two members connected for the relative movement, a spring drum on one of said members, means connecting said drum and the other member to cause relative movement between the members, escapement mechanism on one member and coöperating with the other member, and means for manually operating said escapement mechanism; the member with which said escapement mechanism coöperates being provided with a rack to that end; said escapement mechanism comprising an escapement wheel, and a pinion mounted to rotate with said escapement wheel and engaging with said rack; and said means for manually operating said escapement mechanism comprising spaced dogs adapted to be alternately applied to the teeth of said escapement wheel, and a member for reciprocating said dogs in a path substantially parallel with the axis of said escapement wheel.

4. In combination with two members connected for relative movement, a spring drum on one of said members, means connecting said drum and the other member to cause relative movement between the members, escapement mechanism on one member and coöperating with the other member, and means for manually operating said escapement mechanism; the member with which said escapement mechanism coöperates being provided with a rack to that end; said escapement mechanism comprising an escapement wheel, and a pinion mounted to rotate with said escapement wheel and engaging with said rack; and said means for manually operating said escapement mechanism comprising spaced dogs adapted to be alternately applied to the teeth of said escapement wheel, and a member for reciprocating said dogs in a path substantially parallel with the axis of said escapement wheel; said member for reciprocating said dogs comprising a depressible spring-resisted key, a dog-holder whereby the dogs are connected with the key, and means limiting the movement of the dog-holder and dogs and key.

5. In combination with two members connected for relative movement, a spring drum on one of said members, means connecting said drum and the other member to cause relative movement between the members, escapement mechanism on one member and coöperating with the other member, and means for manually operating said escapement mechanism; the member with which said escapement mechanism coöperates being provided with a rack to that end; said escapement mechanism comprising an escapement wheel, and a pinion mounted to rotate with said escapement wheel and engaging with said rack; and said means for manually operating said escapement mechanism comprising spaced dogs adapted to be alternately applied to the teeth of said escapement wheel, and a member for reciprocating said dogs in a path substantially parallel with the axis of said escapement wheel; said member for reciprocating said dogs comprising a depressible spring-resisted key, a dog-holder whereby the dogs are connected with the key, and means limiting the movement of the dog-holder and dogs and key and including an adjustable stop.

6. In combination with two members connected for the relative movement, a spring drum on one of said members, means connecting said drum and the other member to cause relative movement between the members, escapement mechanism on one member and coöperating with the other member, and means for manually operating said escapement mechanism; the member with which said escapement mechanism coöperates being provided with a rack to that end; said escapement mechanism comprising an escapement wheel, and a pinion mounted to rotate with said escapment wheel and engaging with said rack; and said means for manually operating said escapement mechanism comprising spaced dogs adapted to be alternately applied to the teeth of said escapement wheel, and a member for reciprocating said dogs in a path substantially parallel with the axis of said escapement wheel; rollers being applied to both faces of said escapement wheel adjacent to the zone of reciprocation of said dogs in engagement therewith.

7. In combination with two members connected for the relative movement, a spring drum on one of said members, means connecting said drum and the other member to cause relative movement between the members, escapement mechanism on one member and coöperating with the other member, and means for manually operating said escapement mechanism; the member with which said escapement mechanism coöperates being provided with a rack to that end; said escapement mechanism comprising an escapement wheel, and a pinion mounted to rotate with said escapement wheel and engaging with said rack; and said means for manually operating said escapement mechanism comprising spaced dogs adapted to be alternately applied to the teeth of said escapement wheel, and a member for reciprocating said dogs in a path substantially parallel with the axis of said escapement wheel, means being provided for operatively disconnecting said escapement wheel from said pinion whereby the latter may be rotated without operation of the former.

8. In combination with two members connected for the relative movement, a spring drum on one of said members, means connecting said drum and the other member to cause relative movement between the members, escapement mechanism on one member and coöperating with the other member, and means for manually operating said escapement mechanism; said members being slidably connected, and the means of connection between said drum and said last mentioned member consisting of a flexible extension of the spring drum.

In testimony whereof we have hereunto affixed our signatures in the presence of two witnesses.

ANTHONY W. McCUAIG.
TONY N. CHIDA.

Witnesses:
W. N. HAMAKER,
J. A. WALTON, JR.